No. 626,451. Patented June 6, 1899.
C. A. ALDEN & M. D. PRATT.
SAW GRINDING MACHINE.
(Application filed Mar. 15, 1899.)

(No Model.)

Witnesses
J. G. Hinkel
William E. Neff

Inventors
C. A. Alden
M. D. Pratt
by Watson & Watson
Attorneys

THE NORRIS PETERS CO., PHOTO-LITHO., WASHINGTON, D. C.

UNITED STATES PATENT OFFICE.

CHARLES AMES ALDEN AND MASON D. PRATT, OF STEELTON, PENNSYLVANIA.

SAW-GRINDING MACHINE.

SPECIFICATION forming part of Letters Patent No. 626,451, dated June 6, 1899.

Application filed March 15, 1899. Serial No. 709,204. (No model.)

*To all whom it may concern:*

Be it known that we, CHARLES AMES ALDEN and MASON D. PRATT, citizens of the United States, residing at Steelton, in the county of Dauphin and State of Pennsylvania, have invented certain new and useful Improvements in Saw-Grinding Machines, of which the following is a specification.

Our invention consists in improvements in machines for grinding or sharpening saws, and particularly for grinding circular saws, such as are used in cutting bars of iron, railway-rails, and the like into suitable lengths.

In machines constructed according to our present invention the saws are ground in such manner as to produce obtuse angles between the back edges of the teeth and the side faces of the saw.

Our invention will be more fully described with reference to the accompanying drawings, in which—

Figure 1:
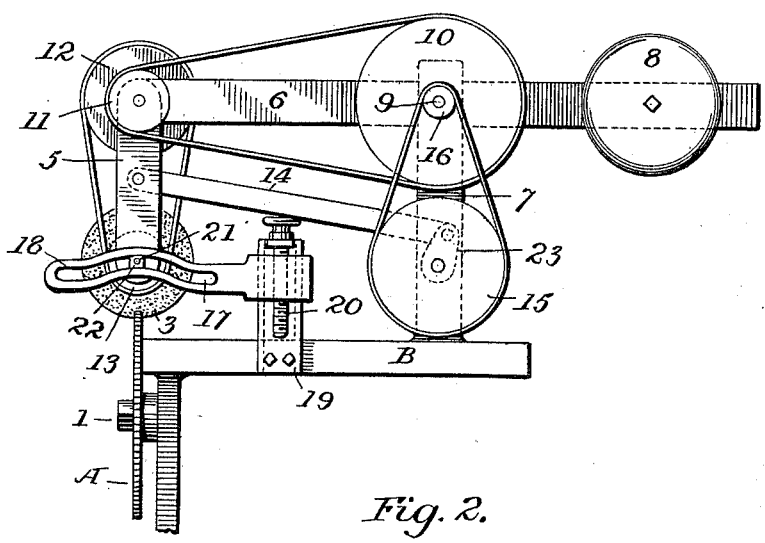
Figure 2:
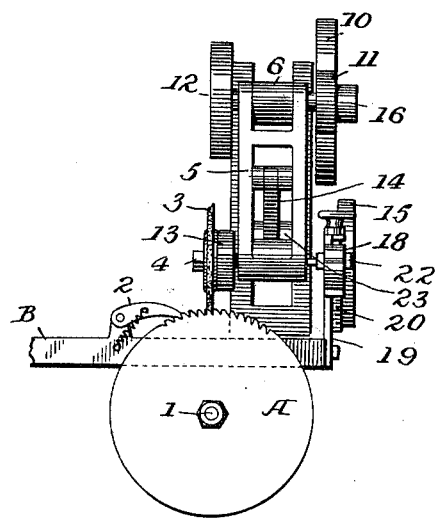
Figure 3:
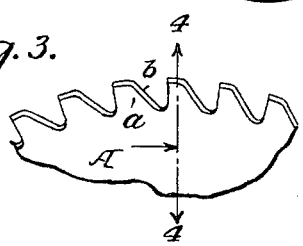
Figure 4:
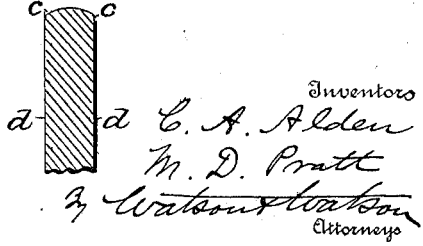

Figure 1 is a side view of a machine embodying our invention. Fig. 2 is a front view of the same. Fig. 3 is a side view of a fragment of a saw, illustrating the work of the machine. Fig. 4 is a section on the line 4 4 of Fig. 3.

Referring first to Figs. 3 and 4, A indicates a circular saw having teeth *a*. The back edges *b* of these teeth are convexly formed, so as to produce obtuse angles *c* where the back edges meet the side faces *d* of the saw-blade, as shown particularly in Fig. 6. The back edges of the saw are preferably curved, as shown; but it will be evident that they may be convex without being strictly curved.

Referring to Figs. 1 and 2, the saw A is mounted upon a spindle 1 with freedom to turn upon said spindle. The spindle is suitably connected to the main frame B. Any suitable mechanism may be used to feed the saw intermittently to present successive teeth to the grinding mechanism. It has not been considered necessary to illustrate such feeding mechanism, as it is well known in the art. In the drawings, 2 indicates a spring-pawl suitable for holding the saw stationary while a tooth is being ground. The grinding-wheel 3 is carried on a spindle 4, which is mounted in a swinging frame 5. The frame 5 is pivotally hung upon the end of a lever 6, which lever is pivotally mounted upon standards 7 and provided with a counterweight 8 to balance the grinding-wheel and its operating mechanism. The grinding-wheel is driven from a power-shaft 9 by pulleys 10, 11, 12, and 13, as shown. The frame 5 is swung to and fro transversely to the plane of the saw by means of a pitman 14, connected to a crank 23, which is driven by a pulley 15 and a small pulley 16 upon the driving-shaft 9.

The path of the grinding-wheel is determined by a reversely-curved guide, which, as shown, is a cam-slot 17 in an arm 18, supported upon a standard 19. The arm is vertically adjustable by means of a screw 20. A post 21, which extends laterally from the frame 5 in line with the axis of the grinding-wheel, carries a pivoted block 22, which runs in the cam-slot 17. The cam-slot, therefore, determines accurately the path of the axis of the grinding-wheel. It will be apparent that the slot, as shown in Fig. 1, will cause the grinding-wheel to rise in approaching the saw to reach its highest point as it is directly over the saw and to travel down on the other side, thus causing it to leave a convex surface on the back of the saw-tooth. The amount of convexity and the exact shape of the surface, whether circular or of a different curvature, can be varied by changing the cam.

Having described our invention, what we claim, and desire to secure by Letters Patent, is—

1. A saw-grinding machine comprising means for holding the saw-blade, a rotating grinding-wheel, means for moving said wheel bodily transversely to the saw-blade, and a curved guide arranged to control the bodily movement of said wheel whereby the rear edges of the saw-teeth are curved, substantially as described.

2. A saw-grinding machine comprising means for holding the saw-blade, a grinding-wheel carried upon a swinging support and movable transversely to the saw-blade, and a slotted curved guide for said grinding-wheel extending across the plane of the saw-blade, substantially as described.

3. In a saw-grinding machine, the combination of means for holding a saw, a rotatable grinding-wheel, means for causing said wheel to travel transversely to the saw-blade, a curved guide arranged to direct said transverse movement of the grinding-wheel to produce a convex surface on the back edges of
5 the saw-teeth, and means for adjusting said guide to and from the saw to vary the depth of the cut, substantially as described.

In testimony whereof we affix our signatures in presence of two witnesses.

CHARLES AMES ALDEN.
MASON D. PRATT.

Witnesses:
JAMES H. BUDD,
R. F. KELKER, Jun.